United States Patent
Liu et al.

(10) Patent No.: US 10,579,916 B2
(45) Date of Patent: Mar. 3, 2020

(54) LOW POWER MAGNETIC SECURE TRANSMISSION SYSTEM

(71) Applicant: Integrated Device Technology, Inc., San Jose, CA (US)

(72) Inventors: Rui Liu, Fremont, CA (US); Tao Qi, San Diego, CA (US); Lijie Zhao, San Jose, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 0 days.

(21) Appl. No.: 16/028,207

(22) Filed: Jul. 5, 2018

(65) Prior Publication Data
US 2019/0012586 A1    Jan. 10, 2019

Related U.S. Application Data

(60) Provisional application No. 62/529,728, filed on Jul. 7, 2017.

(51) Int. Cl.
| | |
|---|---|
| G06K 19/06 | (2006.01) |
| G06Q 20/38 | (2012.01) |
| H04B 5/00 | (2006.01) |
| G06Q 20/34 | (2012.01) |

(52) U.S. Cl.
CPC ..... G06K 19/06196 (2013.01); G06Q 20/382 (2013.01); H04B 5/0031 (2013.01); G06Q 20/347 (2013.01)

(58) Field of Classification Search
USPC ........................................................ 235/493
See application file for complete search history.

(56) References Cited

U.S. PATENT DOCUMENTS

| | | |
|---|---|---|
| 8,814,046 B1 | 8/2014 | Wallner |
| 9,697,450 B1 | 7/2017 | Lee |
| 2016/0149416 A1 | 5/2016 | Ha et al. |

OTHER PUBLICATIONS

International Search Report and Written Opinion dated Sep. 27, 2018 issued in related PCT App. No. PCT/US2018/041026 (13 pages).

*Primary Examiner* — Daniel A Hess
(74) *Attorney, Agent, or Firm* — Haynes and Boone, LLP

(57) ABSTRACT

In accordance with aspects of the present invention, a magnetic secured transmission system is presented. A magnetic secure transmission (MST) system can include a full-bridge driver that includes four transistors configured to regulate current through a coil; and a driving controller coupled to drive the full-bridge driver at a high frequency. In some embodiments, the transistors in the full bridge regulator are driven with a high frequency pulsed-wave modulated (PWM) signal to control the current through the coil. A method of magnetic secured transmission (MST) of MST data according to some embodiments includes receiving the MST data; generating coil data in response to the MST data; driving transistors in a full bridge at a high frequency to drive current through a coil according to the coil data.

16 Claims, 5 Drawing Sheets

LOW POWER MAGNETIC SECURE TRANSMISSION SYSTEM

RELATED APPLICATIONS

The present application claims priority to U.S. Provisional patent application Ser. No. 62/529,728, filed on Jul. 7, 2017, which is herein incorporated by reference in its entirety.

TECHNICAL FIELD

Embodiments of the present invention are related to magnetic transmission systems and, specifically, to low power magnetic secure transmission systems.

DISCUSSION OF RELATED ART

Mobile devices, for example smart phones, tablets, wearable devices and other devices are increasingly using wireless power systems and systems like magnetic secure transmission. Magnetic secured transactions can be used in communications between a wireless power transmitter and a wireless power receiver. However, the most common use of magnetic secure transmission is used to allow mobile devices, e.g. a smartphone, to make credit card purchases from the mobile device. In those systems, the mobile device communicates the credit card information to a point-of-sale device through a magnetic secured transaction that emulates the credit card itself.

In these mobile devices, the magnetic secured transaction system in the mobile device can use a coil to affect the transmission of data between the mobile device and the point-of-sale device. These coils, however, can be inefficient by using a significant amount of power. This can quickly drain the battery of the mobile device.

Consequently, transmitting data using magnetic secure transmission systems can be problematic. Therefore, there is a need to develop better technologies for implementing magnetic secure transmission of data.

SUMMARY

In accordance with aspects of the present invention, a magnetic secured transmission system is presented. A magnetic secure transmission (MST) system can include a full-bridge driver that includes four transistors configured to regulate current through a coil; and a driving controller coupled to drive the full-bridge driver at a high frequency. In some embodiments, the transistors in the full bridge regulator are driven with a high frequency pulsed-wave modulated (PWM) signal to control the current through the coil.

A method of MST data transmission according to some embodiments includes receiving the MST data; generating coil data in response to the MST data; driving transistors in a full bridge at a high frequency to drive current through a coil according to the coil data.

In some embodiments, a magnetic secure transmission (MST) system can include a first transistor coupled between a voltage input and a first end connection for a MST transmit coil; a second transistor coupled between the voltage input and a second end connection for the MST transmit coil; a third transistor coupled between the first end connection and a ground; a fourth transistor coupled between the second end and the ground; a driving control circuit coupled to provide gate signals to the first transistor, the second transistor, the third transistor, and the fourth transistor to provide a high frequency switching signal; and a transmission controller coupled to the driving circuit, the transmission controller coupled to receive MST data and determine current directions through the MST transmit coil to transmit the MST data.

These and other embodiments are further discussed below with respect to the following figures.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description and the accompanying drawings that illustrate inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Figure 1A:
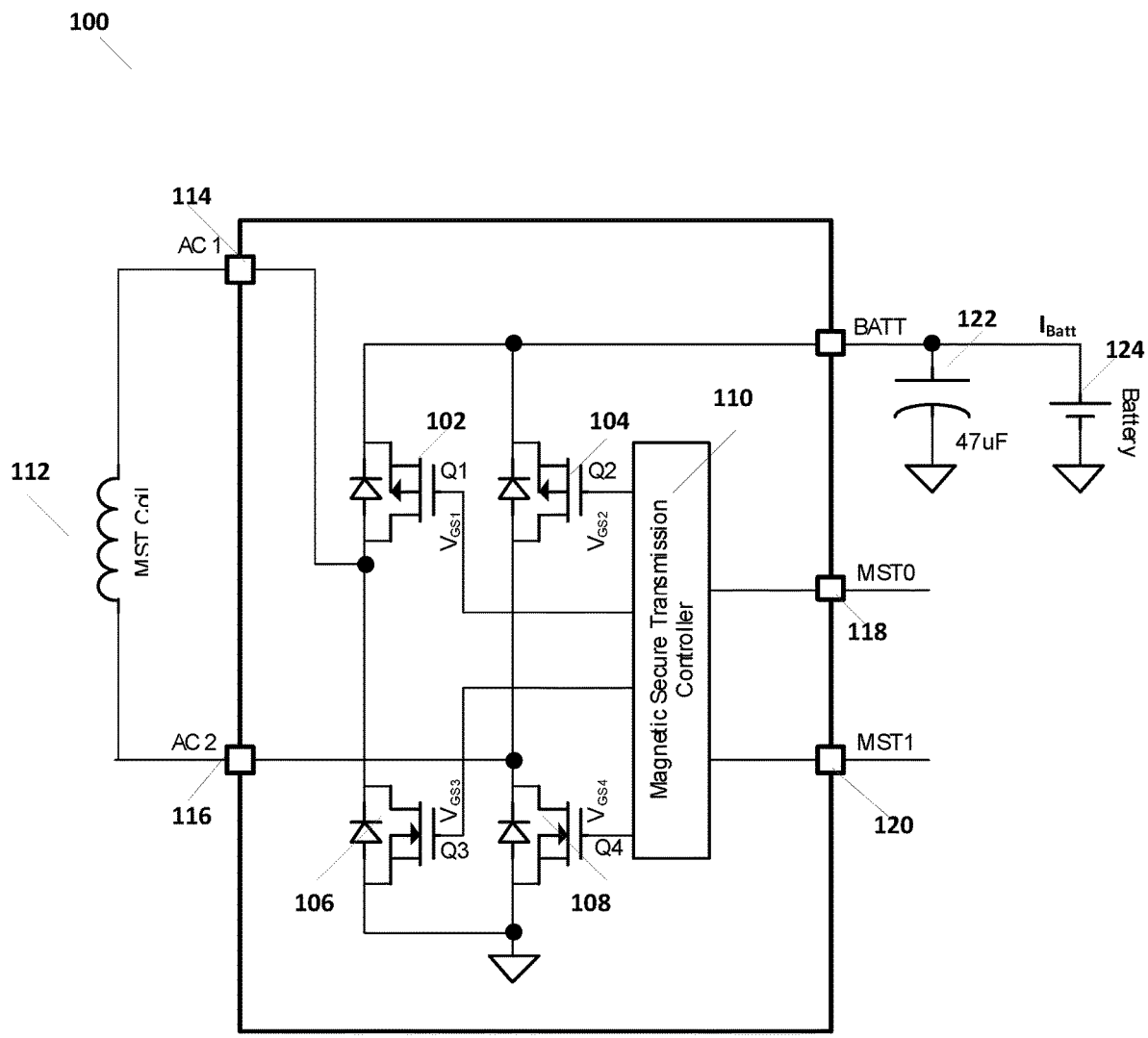
FIGS. 1A and 1B illustrate a conventional magnetic transmission system.

FIG. 1A illustrates a conventional magnetic transmission system 100. As is illustrated, system 100 includes transistors Q1 102, Q2 104, Q3 106, and Q4 108, which may be MOSFETs, coupled to drive current through a MST coil 112. As is illustrated in FIG. 1A, transistor Q1 102 is coupled between a battery input coupled to a battery 124 and an end of MST coil 112, AC1 114. Battery 124 can supply current to system 100 through a capacitor 122 coupled across battery 124.

Transistor 106 is coupled between AC1 114 and ground. Similarly, transistor Q2 104 is coupled between battery 124 and another side of MST coil 112, AC2 116. Transistor Q4 108 is coupled between AC2 116 and ground. Current is driven through MST coil 112 in one direction by turning transistors Q1 102 and Q4 108 on and transistors Q2 104 and Q3 106 off. Current is drive through MST 112 in the opposite direction by turning transistors Q1 102 and Q4 108 off and transistors Q2 104 and Q3 106 on.

Transistors Q1 102, Q2 104, Q3 106, and Q4 108 are coupled to receive power from battery 124 and are driven by a controller 110 that receives data through MST0 118 and MST1 120 and drives transistors Q1 102, Q2 104, Q3 106, and Q4 108 to provide the appropriate current through MST coil 112 to magnetically transmit the data.

However, system 100 illustrated in FIG. 1A uses coil resistance of MST coil 112 to limit battery current from battery 124. The current through MST coil 112 is a function of the voltage of battery 124 and the properties of MST coil 112. In some examples, MST coil 112 can be a 20-30 μH inductance coil with a DC resistance of 1.5 to 2.0 Ω. In order to guarantee MST performance, the MST system 100 is over designed at the lowest battery operation voltage, resulting in more cost and more power consumption from battery. For example, at a battery voltage of 3.5V and a coil resistance of 1.5 Ohm, the power is given by $V^2/R=3.5V*3.5V/1.5$ Ohm=8.2 Watts (W).

Figure 1B:
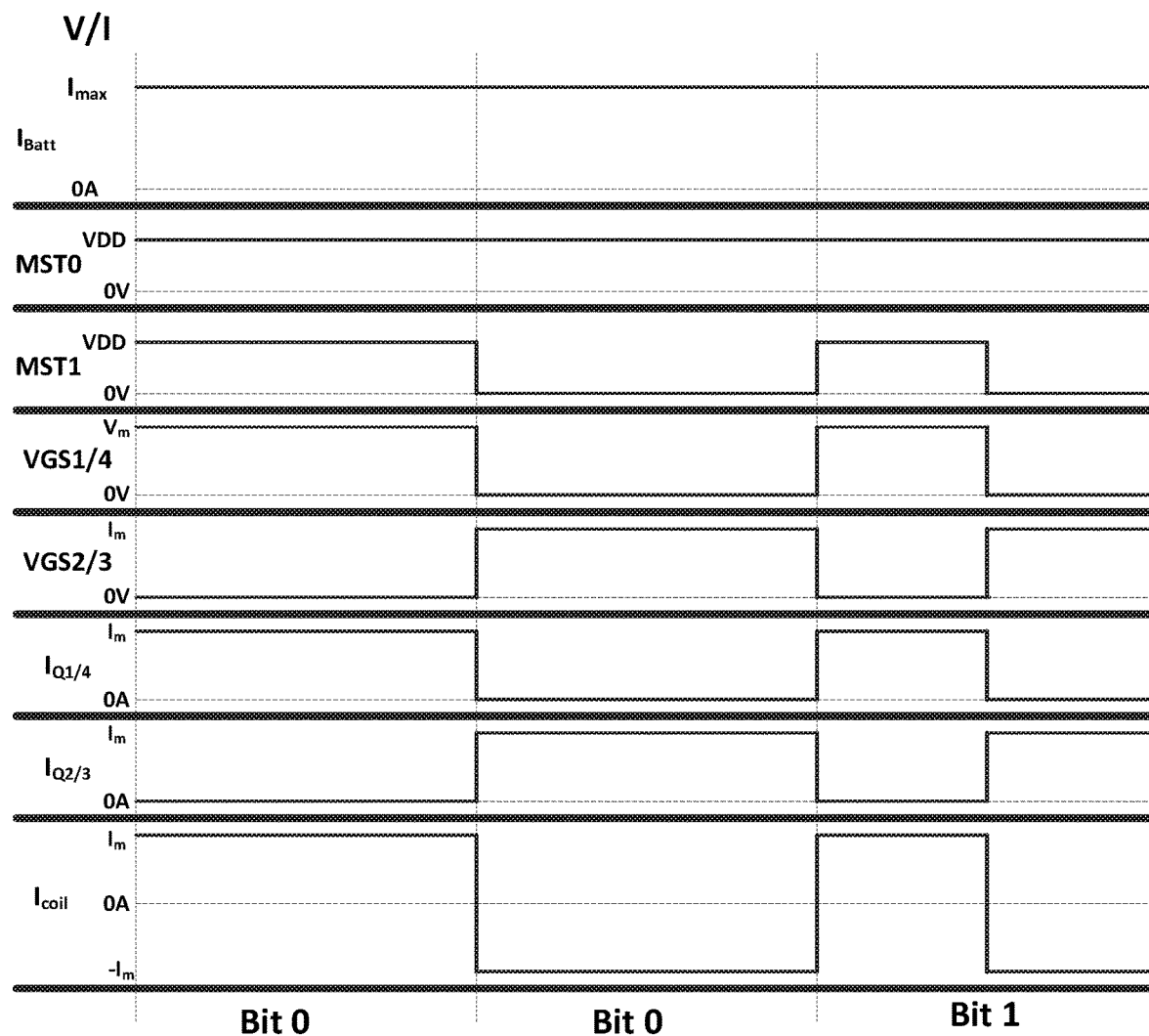

FIG. 1B illustrates waveforms of electrical parameters that occur throughout system 100 during transmission of wireless power transfer. As is shown in FIG. 1B, MST0 118 is set high to VDD while MST1 120 varies between VDD and 0V to transmit Bit 0 and Bit 1 of the data stream. VDD can be a voltage that denotes a high value. VDD may be the batter voltage $V_{BATT}$, or may be another voltage that denotes a high value.

Given the data input of MST0 118 and MST1 120, VGS1/4 indicates the gate voltage of transistors Q1 102 and Q4 108 while VGS2/3 indicates the gate voltage of transistors Q2 104 and Q3 106. The resulting current through MST coil 112 is illustrated by $I_{coil}$. The resulting currents through transistors Q1 102 and Q4 108 is shown by the waveform labeled IGS1/4 and the resulting currents through transistors Q2 104 and Q3 106 are illustrated by waveforms IGS2/3. The resulting batter current is illustrated in waveform $I_{Batt}$. As is illustrated, the battery current $I_{Batt}$ is at a constant level of $I_{max}$. In some embodiments, (e.g. with a battery voltage of 3.5 V and a coil resistance of 1.5 Ohms, $I_{max}$ can be 2.3 Amps).

The system also generates unnecessary power losses at higher battery voltage, for example 4.35V, further reducing battery operation time and generating more heat, which is especially problematic when used in wearable devices such as a smart watch. For example, a 4.35V battery voltage will result in 12.6 W of power loss.

Battery current is the same as the peak current of the MST coil 112. Consequently, battery 124 may be stressed hard during MST data transmission, which can cause battery failure if care is not taken during the design of system 100.

Figure 2:
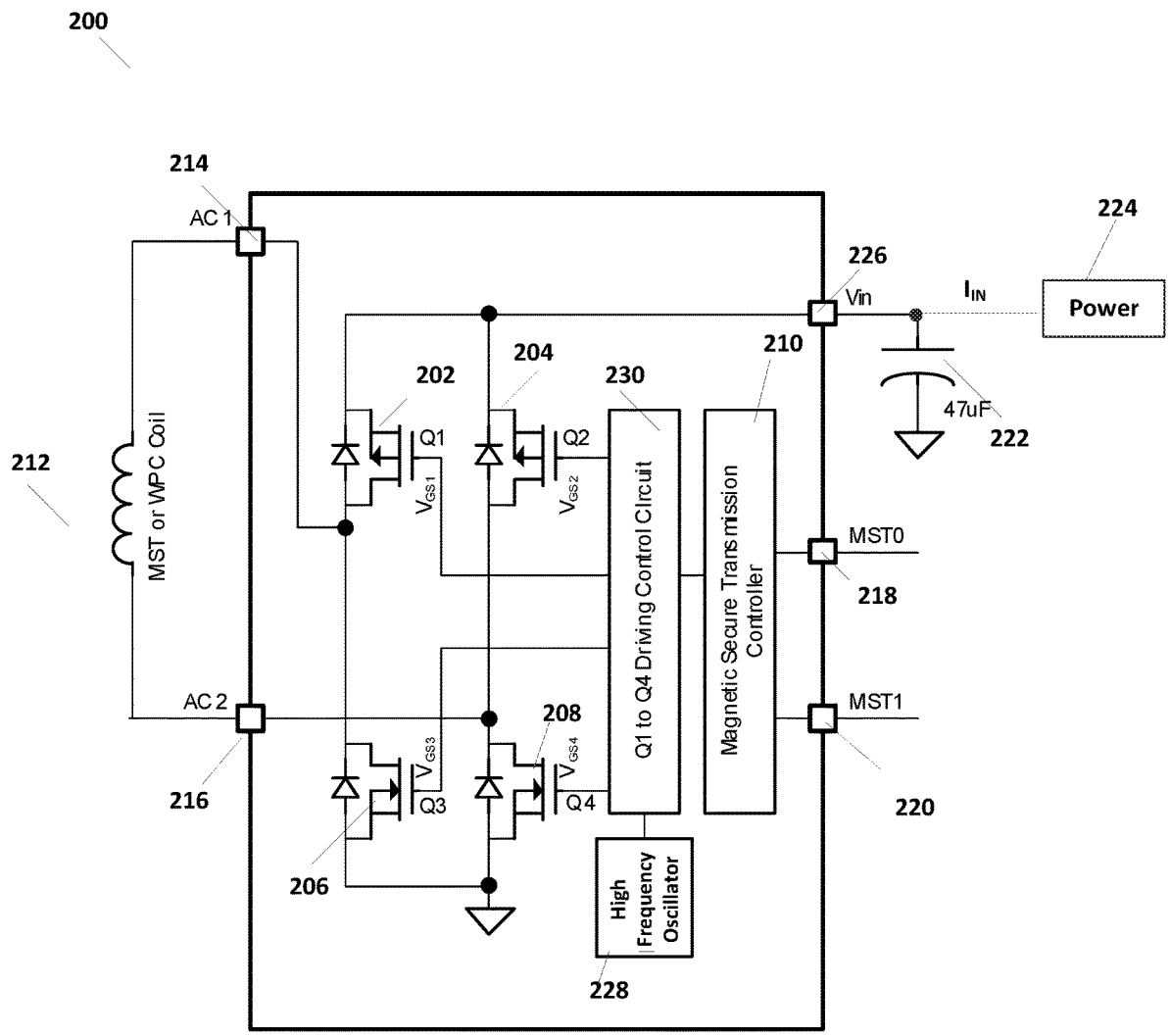
FIG. 2 illustrates a magnetic transmission system according to some embodiments.

FIG. 2 illustrates an embodiment of a MST system 200 according to the present invention. MST system 200 includes transistors Q1 202, Q2, 204, Q3 206, and Q4 208 that are coupled between a voltage input 226, ground, and a MST coil 212 (coupled between AC1 214 and AC2 216) to provide alternating current through MST coil 212 in order to transmit magnetically secured data as received at inputs MST0 218 and MST1 220. Transistors Q1 202, Q2 204, Q3 206, and Q4 208 can, for example, be MOSFETs. Transistors Q1 202, Q2 204, Q3 206, and Q4 208 can be activated to drive current through MST coil 212 to reflect the data that is being transmitted, as is discussed below. As is illustrated in FIG. 2, power is supplied by a power source 224 through a capacitor 222 to voltage input 226. Power source 224 may be a battery, or may include a battery.

As is illustrated in FIG. 2, input data MST0 218 and MST1 220 are input to a controller 210. Controller 210 provides gate control signals for the gates of transistors Q1 202, Q2 204, Q3 206, and Q4 208 in response to the input data MST0 218 and MST1 220 to drive current through transmit coil 212. MST transmission coil 212 can, for example, be a 20-30 μH, 0-1.0 Ω coil instead of the larger resistance coil provided in system 100 in FIG. 1A. The signals from controller 210 are input to a driving control circuit 230. Driving control circuit 230 is further coupled to receive a high frequency signal from a high frequency oscillator 228.

Figure 3:
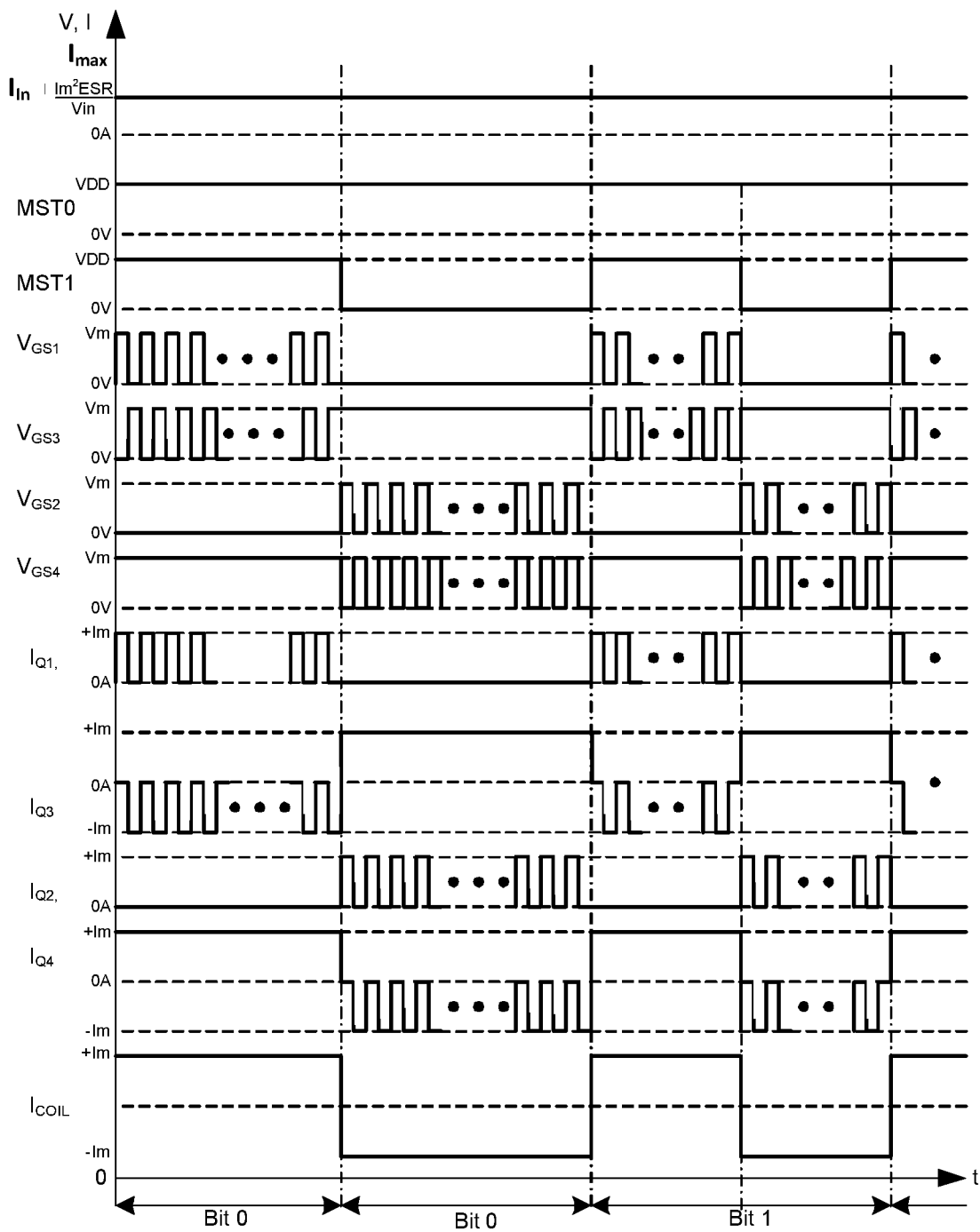
FIG. 3 illustrates operational waveforms for some embodiments.
Figure 4:
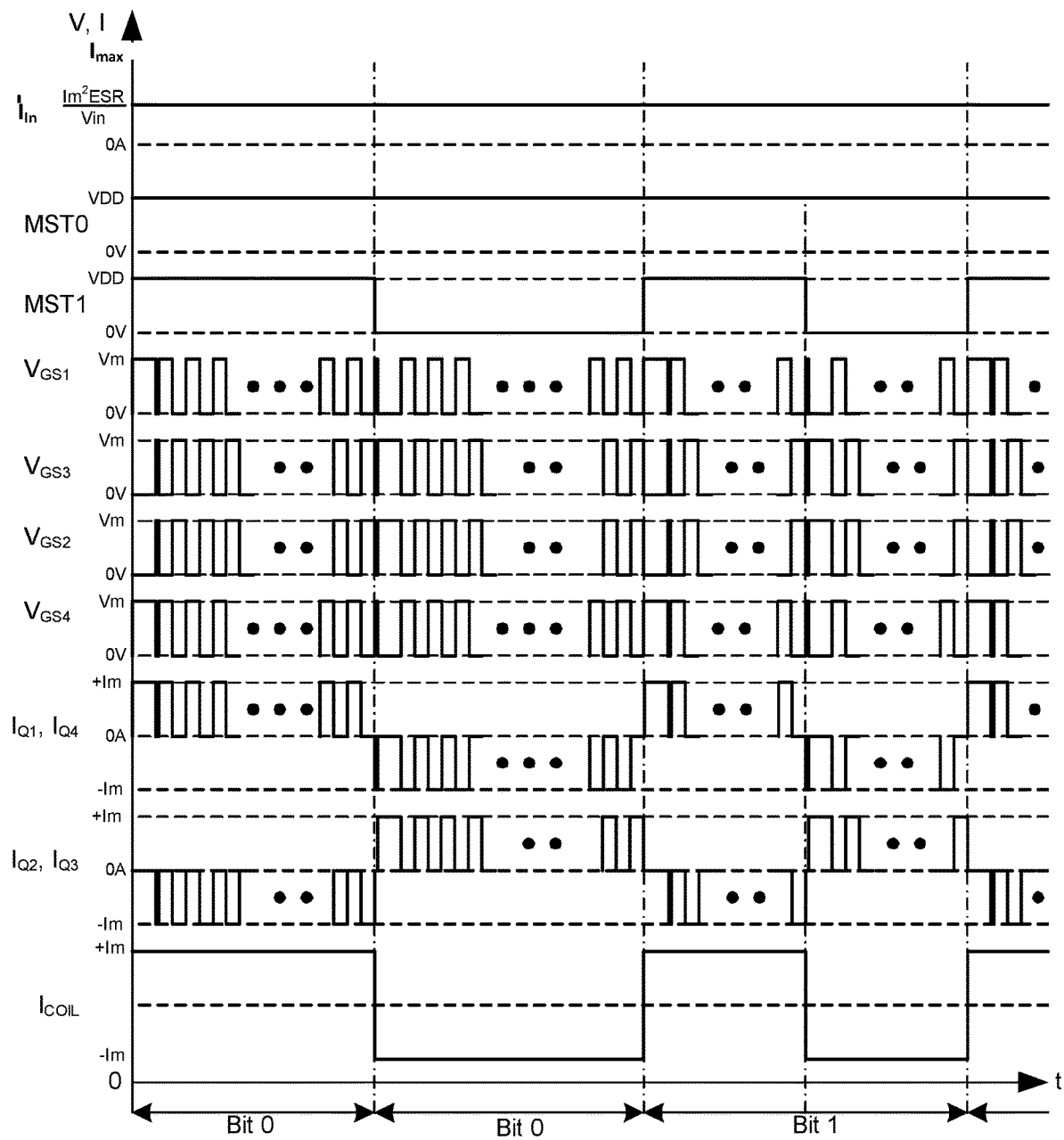
FIG. 4 illustrate operational waveforms for some embodiments.

As is further discussed below, driving control circuit 230 receives the MST transmission system signals from controller 210, which determines the current direction through MST coil 212 that transmits the data received at MST0 218 and MST1 220 according to the MST reader requirements. From the signals received from controller 210, control circuit 230 drives transistors Q1 202, Q2 204, Q3 206, and Q4 208 at high switching frequencies to provide a high frequency pulsed-wave modulated (PWM) current into MST coil 212, where the output magnetic field is the signal determined by controller 210. As is further discussed below, transistors Q1 202 and Q3 206 can be driven in PWM mode and/or transistors Q2 204 and Q4 208 can be driven in PWM mode to drive current through MST coil 212 in opposite directions. FIG. 3 illustrates an example where transistors Q1 202 and Q3 206 or transistors Q2 204 and Q4 208 are driven in PWM mode. FIG. 4 illustrates an example where both pairs of transistors Q1 202 and Q3 206 and transistors Q2 204 and Q4 208 are driven in PWM mode to drive current through MST coil 212.

As a result, the full bridge driver formed by FETs Q1 202 and Q3 206 and FETs Q2 204 and Q4 208 alternates the current through MST coil 212 at a frequency much higher than the standard MST frequencies. MST coil 212 (which may also be a wireless power receive coil) smooths the switching currents provided by FETs Q1 202 and Q3 206 and FETs Q2 204 and Q4 208 resulting in alternating current through coil 212 at the MST frequency. The PWM mode of operation can be used to control the on-time of transistors FETs Q1 202 and Q3 206 and FETs Q2 204 and Q4 208 at a high frequency and/or at the MST frequency to maintain constant amplitude of the output of MST coil 212 independent of any variation in input voltage at $V_{In}$ 226.

In a conventional system such as system 100 illustrated in FIG. 1A, the MST frequency is between 500 Hz and 3 kHz. In system 200, high frequency oscillator 228 and driving control circuit 230 can drive the full bridge (Q1 202, Q2 204, Q3 206, and Q4 208) at a much higher frequency, for example 1 to 2 MHz. Consequently, transistors Q1 202, Q2 204, Q3 206, and Q4 208 are switched at a higher frequency than the corresponding transistors illustrated in FIG. 1A. In driving control circuit 230, embodiments of the present invention can apply high-frequency pulsed-wave modulation (PWM) and/or phase shift control to regulate the current in MST transmit coil 212 over a wide voltage range (e.g., 2V to 4.5V) in order to produce magnetic signals at the lower MST frequencies. Low power MST operation can therefore be achieved by adjusting the PWM signal that affects the MST data transition data determined in transmission controller 210.

There are several advantages to embodiments such as system 200 as shown in FIG. 2. For example, embodiments of the present invention may use the same coil for both wireless power reception and MST transmission of data. Consequently, transmission coil 212 may also operate as a reception coil for wireless power, resulting in lower coil cost. The PWM and/or phase shift control applied by control circuit 230 can be introduced to precisely control the coil current to the desired amplitude as well as to control the slew rate to achieve constant MST performance, as well as saving battery power. A low resistance MST coil or wireless power receiver coil can be used for MST function, resulting in a much lower power consumption during MST operation. For example, with 0.2 Ω WPC coil and 0.3 106 total switch resistance the power consumption is only 2 W for 2 A MST coil current. Further, there is no need for a large tantalum capacitor since the MST coil current slew rate is well controlled. Additionally, there is no need to be directly powered from power source 224, which may include a batter, because the voltage range can be lower, therefore no need for over-voltage protection that may be required in system 100 as illustrated in FIG. 1A.

As is illustrated in FIG. 2, system 200 includes a full bridge driver formed by transistors Q1 202, Q2 204, Q3 206, and Q4 208, all of which can be FETs. Transistors Q1 202, Q2 204, Q3 206, and Q4 208 alternate the current through MST coil 212 at a frequency much higher than MST frequencies. MST coil (or WPC coil) 212 smooth the switching currents generated by transistors Q1 202, Q2 204, Q3 206, and Q4 208, resulting in an alternating current through MST coil 212 that matches the standard MST frequency. In some embodiments, a PWM control method is executed in control circuit 230 to control the switching of transistors Q1 202, Q2 204, Q3 206, and Q4 208 on-time at high frequency and/or MST frequency to maintain constant amplitude of the MST coil current independent of the variation of an input voltage on voltage input 226.

FIG. 3 illustrates operational waveforms for an embodiment of the system illustrated in FIG. 2. As an example, FIG. 3 shows the waveform, from the top of the chart to the bottom of the chart, of the input current $I_{In}$ at voltage input 226, the voltage of MST0 218, the voltage of MST1 220, the gate voltage $V_{GS1}$ of transistor Q1 202, the gate voltage $V_{GS3}$ of transistor Q3 206, the voltage $V_{GS2}$ of transistor Q2 204, the voltage $V_{GS4}$ of transistor Q4 208, the current $I_{Q1}$ through transistor Q1 202, the current $I_{Q3}$ through transistor Q3 206, the current $I_{Q2}$ through transistor Q2 204, the current $I_{Q4}$ through transistor Q4 208, and the current $I_{COIL}$ through MST transmission coil 212.

As is illustrated in the examples waveforms illustrated in FIG. 3, MST0 is set to high (VDD). MST 1 is set in bit 0 to high (VDD) and Low (0V) and is set in bit 1 to High (VDD) and Low (0V). As is illustrated in FIG. 3, FETs Q1 202 and Q3 206, and FETs Q2 204 and Q4 208 are operated in pairs to transmit data. To transmit a MST0=High and MST1=High, FETs Q1 202 and Q3 206 are alternating complementally by a PWM signal at high switching frequency while transistor Q2 204 is off and transistor Q4 208 is high. Similarly, to transmit a MST0=High and MST1=low, transistors Q2 204 and Q4 208 are alternating complementally by PWM signal at high switching frequency while transistor Q1 202 is off and transistor Q3 206 is on. The PWM signal's on-time is determined by required coil current amplitude, input voltage, as well as the equivalent DC resistance of MST coil 212.

As is further illustrated in FIG. 3, the transistors currents vary between 0 A and $I_m$ and follow the PWM cycling of the corresponding transistors. Consequently, each transistor carries a current of $I_m$ when that transistor is cycled on by control circuit 230. Consequently, the current through MST coil 212 cycles between a positive current of $I_m$ and a negative current of $-I_m$ in accordance with the data being transmitted. As is further illustrated, FET Q4 208 is on all the time while FETs Q1 202 and Q3 206 are operated in PWM mode and FET Q3 is on while FETs Q2 204 Q4 208 operate in PWM mode to provide current through coil 212 in the opposite direction. Current direction through the coil is determined by switching between driving FETs Q1 202 and Q3 206 and driving Q2 204 Q4 208 operating alternately in PWM mode.

As is illustrated in FIG. 3, the input current is given by $I_m^2$ (ESR)/$V_{In}$, where $I_m$ is the current through the transistors, ESR is the resistance of coil 212, $I_{max}$ is the maximum input current from $V_{in}$226. This represents a significant power savings by using PWM mode. Power saving can be further achieved by reducing the coil current by certain slope after coil current transition is finished; such coil current control is realized by PWM control method. As a result, the current at voltage input 226 can be given by a value less than the maximum DC current available through coil 212.

As is illustrated, in the embodiment of FIG. 3 transistors Q1 202 and Q3 206 is operated as a pair while transistors Q2 204 and Q4 208 are operated as a pair. The pairs of transistors Q1 202/Q3 206 and Q2 204/Q4 206 are each operated complementally by PWM signals at a high switching frequency when the pair is activated. While Q1/Q3 are operated in PWM mode, transistors Q2/Q4 are set with Q4 on and Q2 off. Similarly, while Q2/Q4 are operated in PWM mode, transistors Q1/Q3 are set with Q1 off and Q3 on. The PWM on-time is determined by required coil current amplitude, input voltage, and the equivalent DC resistance of coil 212.

FIG. 4 illustrates another waveform according to some embodiments of the present invention. Similar to the waveforms illustrated in FIG. 3, FIG. 4 shows the waveform, from the top of the chart to the bottom of the chart, of the input current $I_{In}$ at voltage input 226, the voltage of MST0 218, the voltage of MST1 220, the gate voltage $V_{GS1}$ of transistor Q1 202, the gate voltage $V_{GS3}$ of transistor Q3 206, the voltage $V_{GS2}$ of transistor Q2 204, the voltage $V_{GS4}$ of transistor Q4 208, the current $I_{Q1}$ and $I_{Q4}$ through transistors Q1 202 and Q4 208, the current $I_{Q2}$ and $I_{Q3}$ through transistors Q2 204 and Q3 206, and the current $I_{COIL}$ through MST transmission coil 212.

As is illustrated and discussed above, FETs Q1 202 and Q3 206 and FETs Q2 204 and Q4 208 are operate in pairs. As is illustrated in FIG. 4, to transmit data, FETs Q1 202 and Q3 206 are alternating complementally by PWM signal at high switching frequency. Similarly, FETs Q2 204 and Q4 208 are alternating complementally by PWM signal at high switching frequency. The on-time of the PWM signals is determined by the required coil current amplitude, coil current direction, coil current transient slew rate, input voltage, as well as the equivalent DC resistance. Power saving can be further achieved by reducing the coil current by certain slope after coil current transition is finished; such coil current control is realized by PWM control method. Further EMI improvement can be implemented by interleaving (both symmetrically or asymmetrically) the Q1 202/Q3 206 PWM signal and Q2 204/Q4 208 PWM signal.

As illustrated in FIG. 2, a circuit according to some embodiments comprises a full-bridge driver formed from FETs Q1 202 and Q3 206 and FETs Q2 204 and Q4 208 to regulate the current of the MST coil 212. The full-bridge driver formed from FETs Q1 202 and Q3 206 and FETs Q2 204 and Q4 208 can function as MST driver and/or wireless power transceiver. Further, the circuit can include a coil 212 that is used as MST coil and/or wireless power coil. Further, the circuit includes a driving control circuit that generates control signals that drives FETs Q1 202 and Q3 206 and FETs Q2 204 and Q4 208 at a high switching frequency to maintain a constant amplitude of coil 212 at an MST frequency, independent of the variation of the voltage applied at $V_{In}$ 226.

In some embodiments, the driving control circuit 230 can drive FETs Q1 202/Q3 206 and FETs Q2 204/Q4 208 to operate alternately in PWM mode to change the coil current directions, as is illustrated in FIG. 3. In some embodiments, the driving control circuit can drive both FETs Q1 202/Q3 206 and FETs Q2 204/Q4 208 to operate in PWM mode to change the coil current directions, as is illustrated in FIG. 4. In some embodiments, interleaving of the Q1 202/Q3 206 PWM signal and Q2 204/Q4 208 PWM signal can be implemented for EMI improvement.

In some embodiments, the PWM control method executed by control circuit 230 can regulate 1) the slew rate of the MST coil current transient, 2) the amplitude of the MST coil current, and/or 3) the power saving slope so as to meet MST reader requirements and to be independent of the input voltage. In some embodiments, a soft start method that ramps up the current of the MST coil slowly to avoid interruptions in MST coil current when MST data transmission starts. In some embodiments, the slew rate, the amplitude, and the power saving slope are programmable.

The above detailed description is provided to illustrate specific embodiments of the present invention and is not intended to be limiting. Numerous variations and modifications within the scope of the present invention are possible. The present invention is set forth in the following claims.

What is claimed is:

1. A magnetic secure transmission (MST) system, comprising:
    a full-bridge driver that includes four transistors configured to regulate current through a coil, the four transistors including a first pair of series coupled transistors in parallel with a second pair of series coupled transistors; and
    a driving controller coupled to drive the full-bridge driver, the driving circuit driving each transistor of the first pair of transistors or each transistor of the second pair of transistors at a frequency higher than an MST frequency, wherein the driving controller applies first driving signals at the frequency to the first pair in response to a first MST signal and second driving signals at the frequency to the second pair in response to a second MST signal.

2. The system of claim 1, wherein the full-bridge driver can function as an MST driver and/or a wireless power transceiver.

3. The system of claim 2, wherein the coil can be used as a MST coil and/or a wireless power coil.

4. The system of claim 1, wherein the driving controller can operate both pairs of the four transistors in PWM mode simultaneously.

5. The system of claim 1, wherein the driving controller can operate the full-bridge driver in with PWM signals to interleave pairs of the four transistors.

6. The system of claim 1, wherein the driving controller can use a PWM control method and can regulate the slew rate of a current transient through the coil.

7. The system of claim 1, wherein the driving controller can use a PWM control method and can regulate the amplitude of current through the coil.

8. The system of claim 1, wherein the driving controller can use a PWM control method and can regulate a power saving slope.

9. The system of claim 1, further including a soft start method that ramps a current through the coil slowly to avoid interruptions in coil current when data transmission starts.

10. The system of claim 1, wherein the driving controller is programmable to control slew rate, amplitude, and/or power saving slope.

11. A method of magnetic secured transmission (MST) of MST data, comprising:
    receiving the MST data;
    generating coil data in response to the MST data;
    driving transistors in a full bridge at a high frequency greater than a frequency of the MST data to drive current through a coil according to the coil data,
    wherein the transistors include a first transistor, a second transistor, a third transistor, and a fourth transistor, the first transistor and the third transistor coupled in series between a voltage and a ground, the second transistor and the fourth transistor coupled in series between the voltage and the ground, the coil being coupled between a first node between the first transistor and the third transistor and
    wherein driving transistors includes driving the first transistor and the third transistor at the high frequency in response to a first coil data and driving the second transistor and the fourth transistor at the high frequency in response to a second coil data.

12. A magnetic secure transmission (MST) system, comprising:
    a first transistor coupled between a voltage input and a first end connection for a MST transmit coil;
    a second transistor coupled between the voltage input and a second end connection for the MST transmit coil;
    a third transistor coupled between the first end connection and a ground;
    a fourth transistor coupled between the second end and the ground;
    a driving control circuit coupled to provide gate signals to the first transistor, the second transistor, the third transistor, and the fourth transistor to provide a high frequency switching signal, the high frequency switching signal being at a frequency greater than a frequency of a MST data; and
    a transmission controller coupled to the driving circuit, the transmission controller coupled to receive MST data and determine current directions through the MST transmit coil to transmit the MST data,
    wherein the driving control circuit provides first gate signals at the frequency to the first transistor and the third transistor in a first current direction and provides second gate signals at the frequency to the second transistor and the fourth transistor in a second current direction.

13. The system of claim 12, wherein the high frequency switching is a pulsed-wave modulated (PWM) signaling to provide PWM current through MST transmit coil.

14. The system of claim 13, wherein the on-time is adjusted to control current through the MST transmit coil.

15. The system of claim 13, wherein a first pair of transistors formed by the first transistor and the second transistor are complementarily driven by the PWM gate signals to provide a first direction current through the transmit coil and a second pair of transistors formed by the second transistor and the fourth transistor are complementarily driven by the PWM gate signals to provide a second direction current through the transmit coil.

16. The system of claim 15, wherein the first pair and the second pair are complementarily driven to provide the first direction current or the second direction current.

* * * * *